Figure 1:
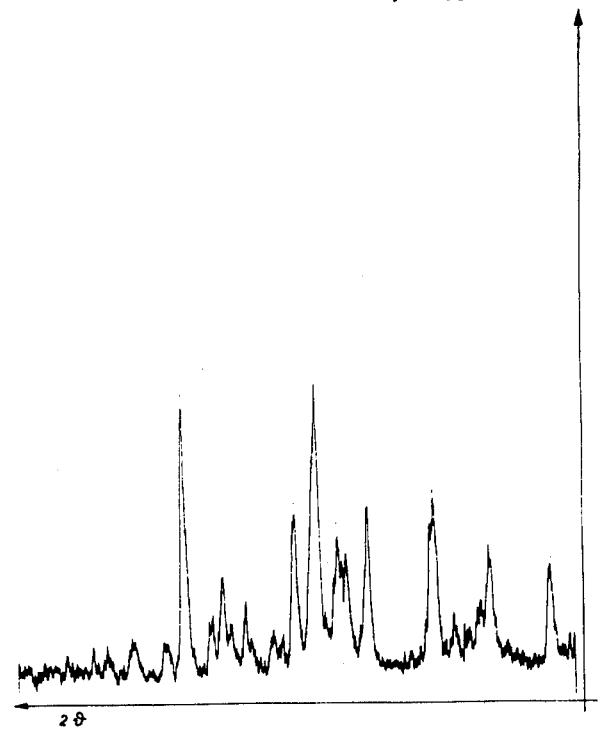

3,238,104
REABSORBABLE AESCIN COMPOSITION
AND METHOD OF MAKING
Rolf Madaus, Hans Erbring, and Wilhelm Winkler, Cologne-Merheim, Germany, assignors to Dr. Madaus & Co., Cologne-Merheim, Germany
Filed Dec. 13, 1963, Ser. No. 330,479
Claims priority, application Germany, Dec. 14, 1962, M 55,118; Switzerland, Dec. 6, 1963, 14,887/63
3 Claims. (Cl. 167—81)

This invention relates to therapeutically useful saponin preparations, particularly to injectable solutions and water soluble and readily resorbed preparations.

The therapeutic effect of triterpene saponins, particularly such saponins of acidic reaction such as aescin from Aesculus species and primulic acid from Primula species, is well known. Their general application for medical purposes has met with difficulties because such saponins in the form of crystallized free acid, have a very low water solubility. In addition, such solutions tend to form micelles, recognizable from the critical micell concentration (CMC).

It is also known to improve the solubility of such saponins by adding a salt forming agent, for instance alkali metal ions, organic bases such as hydroxyalkylamines, alkaloids, or generally nitrogen containing organic compounds of sufficient basicity in stoichiometric or approximately stoichiometric proportions. However, the biological activity of such solutions is affected by sterilization.

Though preparations of such saponin salts in aqueous solution show an antiexudative effect at the pharmacological model (rats feet test) when administered parenterally, enteral and oral administration are not effective because it has been impossible to produce absorption of the saponins in the intestinal tract.

It is, therefore, a principal object of the invention to provide a method for increasing the water solubility and resorptiveness of saponins wtihout formation of salts.

It is another object of the invention to provide a method for stabilizing saponin solutions.

A further object of the invention is to provide stable saponin solutions, particularly for injections.

Still another object is to provide tablets which contain the saponin in a form capable of enteral reabsorption and which are, therefore, suitable for oral application.

Still other objects and advantages will be apparent from a consideration of the specification and claims.

Attempts to increase the solubility of crystalline triterpene saponins by decreasing their particle size in ball or jet mills had no success. Comminution to a particle size of $<5\mu$ produced a higher rate of solution but did not substantially increase the dissolved amounts. Neither gave grinding in a roll mill better results.

Unexpectedly, however, grinding in a agate or hard porcelain mortar produced an abrupt increase of the solubility. For instance, the solubility of crystalline aescin in water is 0.01%. After grinding in a mortar mill (Mörsermühle) for at least 50 hours, the solubility increased to more than 2%, i.e. more than 200 times. For primulic acid, the corresponding figures are 0.01% and 1%, respectively.

Figure 2:
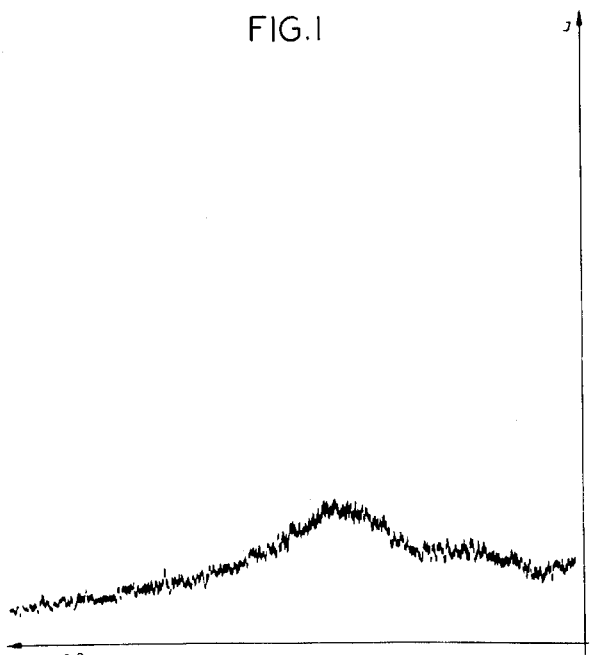

An explanation of such unexpected solubility increase is found in a comparison of the X-ray diagrams which are shown in the accompanying drawings, where FIG. 1 is the X-ray diagram of conventional crystalline aescin, and FIG. 2 is a similar diagram of the same aescin after it had been ground for about 50 hours in a mortar.

The X-ray diagrams were taken with the $K_a$ line of Co through an iron filter. The ordinate indicates the intensity whereas the abscissa gives the value of the scattering angle $2\theta$ ($\theta$=Bragg angle).

FIG. 1 is the X-ray diagram of crystalline aescin as conventionally obtained. The sharp interferences of strong intensity indicate a well developed crystal structure consisting essentially of crystal platelets with relatively wide spacings perpendicularly to the plane of the platelets. The crystals are biaxial-positive. The angle between the two optical axes is about 50°. In this form, the aescin has only a low solubility in water.

The diagram of FIG. 2 shows only broad intensity maxima as a function of the scattering angle, which means that the aescin has been converted to an X-ray amorphous state. In this form, the water solubility is considerably increased.

Other triterpene saponins give similar X-ray diagrams.

A treatment destroying the crystal lattice structure requires shearing forces which can normally not be obtained in a ball or jet mill but necessitates grinding in a mortar or mortar mill. Such forces can be attained also in a roll mill when the rolls are rotated at different speeds. The essential condition for the observed effect is not the dispersion (particle size) but the destruction of the lattice structure.

Therefore, the invention consist in subjecting a crystallized triterpene saponine to strong shearing forces for a time sufficient to destroy the crystal lattice. The thus attained X-ray amorphous state is recognized by the considerably increased water solubility of the saponin. Such modification of the physical properties of saponins by obliteration of the forces producing the lattice arrangement was not known heretofore.

The solutions of such X-ray amorphous saponins are, of course, not solutions in the classical sense of Gay-Lussac. According to their concentration, they require varying times for obtaining the thermodynamic equilibrium. Solutions of such dissolved saponins can be stabilized by adding to the saponin complexing compounds which block recrystallization of the saponins.

If adenine is added to a metastable solution of a saponine ground to the X-ray amorphous state, the solution remains stable for several months by virtue of the formed molecular addition (complex) compounds. Adenosine acts in the same manner. As shown by potentiometric measurements, there is no salt but only complex formation in both cases.

Similar results are obtained when adenine or adenosine is added in solid form to the triterpene saponine prior to its crystal disintegration. In this case, the conversion of the triterpene saponine into the X-ray amorphous state proceeds simultaneously with the topochemical formation of a molecular addition compound. If the reaction product is dissolved in water, stable solutions are obtained.

Also glucosides of the flavonoid type, such as hesperidin, rutin, quercitrin, and others form complexes or addition products with X-ray amorphous saponins by topochemical reaction. For this purpose, the saponin and glucoside are preferably ground together in the manner described above, whereby the triterpene saponine is disintegrated to the lattice amorphous state and simultaneously complexed with the flavonoid glucoside. In spite of the water insolubility of both components, the complex is readily dissolved in water. The solutions are opalescent but remain stable for extended periods of time, at least for several months.

Also after lyophilization of the solutions of the recited complexes, their water solubility and ready water dispersibility is retained.

The novel saponin preparations have valuable therapeutic properties. They are suitable pharmaceuticals not only for injections but also for oral application.

For instance, an aescin-adenine solution containing 70 to 90 percent by weight of adenine, calculated on the aescin content, is suitable for parenteral injection; for oral application with resorption in the digestive tract, a preparation of X-ray amorphous aescin or of an aescin-hesperidin complex containing 1 to 30 parts of hesperidin per 100 parts of aescin may be used.

The method of the invention succeeds in converting triterpene saponins which are normally not resorbed and are therefore unsuitable for oral application, into a state where they are readily absorbed enterally; thus, the invention offers for the first time the possibility of a successful oral therapy. These observations are corroborated by tests determining the antiedemic effect in the rats feet test (see e.g. Pharmaceutical Reviews, vol. 10, page 480).

The swellings were determined which developed after interplantar injection of 0.1 ml. of a 2% ovalbumin into a hind paw. If, 16 hours prior to such an edema provocation, the animals were orally administered a single dose of 5 mg./kg. of X-ray amorphous aescin or aescin-hesperidin, the swellings were considerably reduced. Comparative tests showed that, 1 hour after edema provocation, the inhibition produced by the X-ray amorphous aescin was 28%, by X-ray amorphous aescin-hesperidin 35%.

Further tests showed that the same antiexudative effect, i.e. an edema inhibition by 30%, was obtained when the animals had received intravenously 0.3 mg./kg. of sodium aescinate (from crystalline aescin). Accordingly, for rats, the enteric resorption quota of orally administered doses of X-ray amorphous preparations of aescin or aescin-hesperidin is 6%. In this respect, it must be emphasized that the oral administration of solutions of normal crystalline aescin or even sodium aescinate had no inhibiting effect whatsoever on the rat edemas.

The results shown in the animal tests have been confirmed by the clinical successes which were obtained by oral administration of X-ray amorphous aescin preparations. The recommended dose is 1 to 2 aescin-hesperidin dragées each containing 10 mg. of X-ray amorphous aescin 3 times daily.

The following examples are given to illustrate the invention.

EXAMPLE 1

50 g. of crystallized aescin were ground in a mortar mill (achate, hard porcelain) for 50 hours. 2 parts of the thus comminuted saponin were soluble at room temperature (20° C.) in 100 parts of water, indicating that the crystal lattice had been completely destroyed.

EXAMPLE 2

50 g. of crystallized primulic acid were treated in the same manner as set forth in Example 1. 1 part of the ground product was soluble in 100 parts of water.

EXAMPLE 3

2.0 g. of the aescin obtained according to Example 1 were dissolved in one liter of twice distilled water at room temperature, and 1.8 g. of adenine were added to said solution, also at room temperature. A water clear stable solution was obtained which could be sterilized.

EXAMPLE 4

Example 3 was repeated with 1.0 g. of the primulic acid obtained in Example 2, and 0.9 g. of adenine were added to said solution. Also in this case, a stable water clear and sterilizable solution was obtained.

EXAMPLE 5

2 g. of the aescin obtained according to Example 1 were dissolved in one liter of twice distilled water at room temperature, and 3 g. of adenosine were added to said solution. A water clear stable solution was obtained, which could be sterilized.

EXAMPLE 6

50 g. of crystalline aescin and 45 g. of adenine were ground as described in Example 1. 0.38 part of the reaction product dissolved in 100 parts of water.

EXAMPLE 7

50 g. of crystalline aescin and 75 g. of adenosine were ground as described in Example 1. 0.5 part of the reaction product dissolved in 100 parts of water.

EXAMPLE 8

50 g. of crystalline aescin and 15 g. of hesperidin were ground as in the preceding example. The effect of the topochemical reaction was verified by the following hesperidin test: 30 mg. of the reaction product were dissolved in 125 ml. of water. The solution was opalescently clouded. 50 ml. of 0.2 N potassium hydroxide solution were added to 50 ml. of said solution, and the mixture was heated on the water bath at 100° C. for 5 minutes. Subsequently, the extinction was determined at $\lambda = 360$ m$\mu$.

We claim:

1. A method of making therapeutically valuable saponin preparation comprising essentially subjecting a crystallyized acid triterpene saponin to shearing forces for a time sufficient to destroy the crystal structure and to convert the saponin to the X-ray amorphous state of increased water solubility.

2. A method of making therpeutically valuable saponin preparations comprising essentially subjecting a crystallized acid triterpene saponin in mixture with a flavonoid glucoside to shearing forces for a time sufficient to destroy the crystal structure and to convert the saponin to the X-ray amorphous state of increased water solubility.

3. A reabsorbable water soluble aescin composition containing an intimate mixture of non crystalline X-ray amorphous aescin with hesperidin in an amount of 1 to 30 parts by weight of hesperidin per 100 parts of aescin.

References Cited by the Examiner

UNITED STATES PATENTS

| | | | |
|---|---|---|---|
| 2,123,248 | 7/1938 | Markwood | 260—236 |
| 2,350,804 | 6/1944 | Ohta | 167—81 |
| 2,691,654 | 10/1954 | Hitchings et al. | 260—252 |
| 2,780,620 | 2/1957 | Krider et al. | 260—210.5 |
| 3,110,711 | 11/1963 | Wagner et al. | 260—210.5 |

LEWIS GOTTS, *Primary Examiner.*